United States Patent [19]

Jodrey et al.

[11] Patent Number: 4,458,805
[45] Date of Patent: Jul. 10, 1984

[54] BOTTLE STABILIZER

[75] Inventors: Robert M. Jodrey, Westboro; Walter E. Ryll, Clinton, both of Mass.

[73] Assignee: Dennison Manufacturing Company, Framingham, Mass.

[21] Appl. No.: 356,062

[22] Filed: Mar. 8, 1982

[51] Int. Cl.³ .............................................. B65G 15/16
[52] U.S. Cl. .................................... 198/481; 198/628; 198/836
[58] Field of Search .............. 198/480, 481, 626, 627, 198/628, 836

[56] References Cited

U.S. PATENT DOCUMENTS

| | | | |
|---|---|---|---|
| 1,743,018 | 1/1930 | Magnusson et al. | 198/628 X |
| 3,386,565 | 6/1968 | Carter | 198/628 |
| 3,718,819 | 2/1973 | Miksitz | 198/628 X |

Primary Examiner—Jeffrey V. Nase
Attorney, Agent, or Firm—Arthur B. Moore

[57] ABSTRACT

Apparatus for stabilizing bottles and like articles after transfer to an underlying conveyor. A bottle ejected from a turret or other transport device is trapped under an inclined belt, and steadied thereby to travel in an upright orientation at the speed of the underlying conveyor. The inclined belt is depressed by a downwardly biased plate, which is pivotally mounted at its upstream end to a vertically adjustable spring retainer block.

7 Claims, 2 Drawing Figures

BOTTLE STABILIZER

BACKGROUND OF THE INVENTION

The present invention relates to conveyors for bottles and like articles, and more particularly to apparatus for stabilizing such articles during transport.

A turret is a well know device for conveying bottles in a circular path for imprinting or other processing. Such turrets are an integral part of the heat transfer decorators described, for example, in U.S. Pat. Nos. 3,064,714; 3,079,979; 3,261,734; 3,709,755; 3,741,373; and 4,214,937. Typically such turrets receive articles from and discharge them to underlying conveyor belts. A common difficulty in such bottle transport apparatus is the instability of articles transferred from a turret to a conveyor belt, due in part to a difference between the transport speeds of these devices. This problem is particularly acute in the case of tall, narrow articles, and at high transport speeds.

Accordingly, it is a primary object of the invention to provide a device for stabilizing bottles and other articles during transport. A related object is the prevention of bottle toppling during interchange between bottle transport devices.

Another object of the invention is to facilitate the handling of bottles of various shapes and sizes. In particular the apparatus of the invention is useful in the transport of tall, narrow articles.

A further object of the invention is to facilitate the high speed transport of bottles.

SUMMARY OF THE INVENTION

The above and related objects are accomplished in the bottle stabilizing device of the invention, which traps bottles or similar articles under an inclined, downwardly biased belt and stabilizes them with respect to a horizontal base conveyor.

In accordance with one aspect of the invention articles are trapped under a continuous belt which is depressed by a plate. The plate is pivotally mounted at an input end of the block, and downwardly biased by a series of compression springs or other biasing members. As a related aspect, the block provides a housing for the compression springs and is vertically adjustable.

In accordance with another aspect of the invention, the continuous belt is driven at a speed matching that of the base conveyor.

BRIEF DESCRIPTION OF THE DRAWINGS

The above and additional aspects of the invention are illustrated in the detailed description which follows, taken in conjunction with the drawings in which.

DETAILED DESCRIPTION

Figure 1:
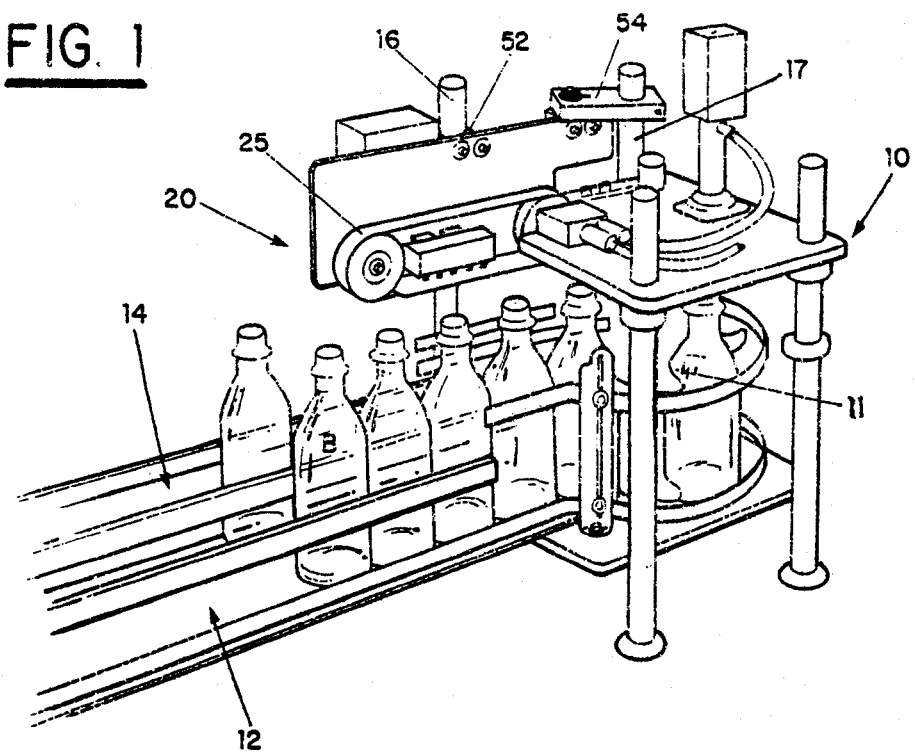
FIG. 1 is a perspective view of bottle stabilizing apparatus in accordance with the preferred embodiment, in combination with a four-station turret and infeed outfeed conveyors.

A preferred design of bottle stabilizing apparatus in accordance with the invention is shown in the perspective view of FIG. 1, utilized in transferring bottles B from a conventional turret 10 to an outfeed belt conveyor 12 with guide rail 14. It is characteristic of this transfer that bottles are ejected from turret cutouts 11 at a relatively high speed as compared with the belt conveyor speed. Bottle stabilizer 20 ensures that bottles will come to rest on conveyor 12 in an upright orientation.

Figure 2:
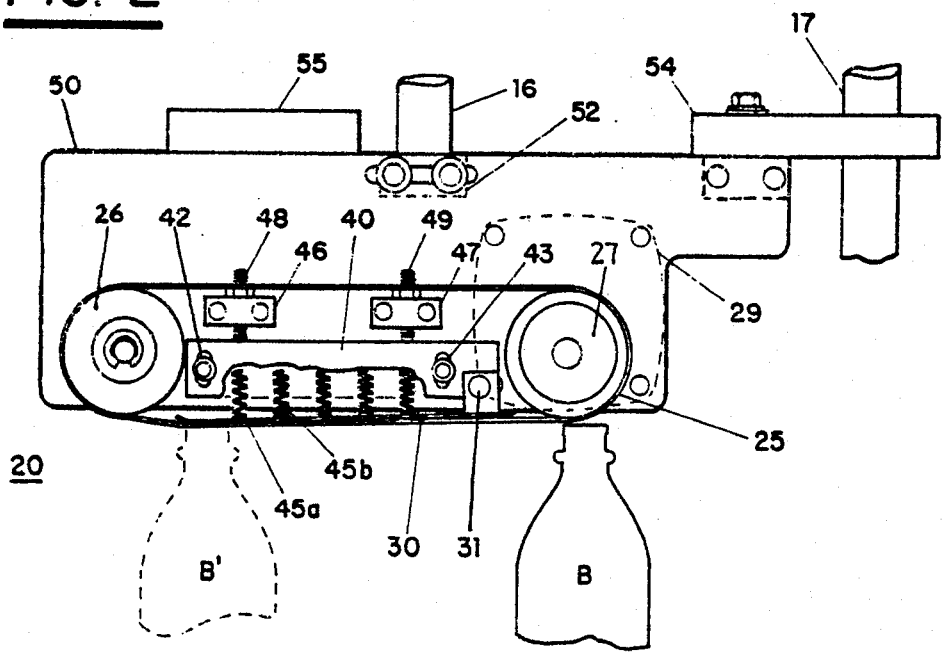
FIG. 2 is an elevation view of the bottle stabilizing device of FIG. 1.

With reference to the elevation view of FIG. 2, stabilizer 20 engages bottles B with a continuously rotating conveyor belt 25. Belt 25 is driven by pulleys 26 and 27, the former being an idler pulley and the latter coupled to drive motor 29 (shown in phantom). Motor 29 illustratively comprises a gear motor, which may be driven at a variety of speeds controlled from speed control module 55. The advance of conveyor belt 25 is coordinated with that of the underlying conveyor 14 so that bottles will be stabilized under belt 25 at the outfeed conveyor speed.

As shown in FIG. 2, the lower expanse of belt 25 is depressed by a runner plate 30, giving the belt a descending profile in the direction of bottle advance. Runner plate 30 is downwardly biased by a series of compression springs 45a–45e. These are housed in a spring retainer block 40, to which runner plate 30 is pivotally mounted at the upstream end at 31. Spring retainer block 40 is adjustably mounted in slots 42 and 43 to permit variation of its height. The user may effect this adjustment by turning adjustment screws 48 and 49 mounted in adjusting blocks 46 and 47.

The various components of stabilizer assembly 20 are carried by a support plate 50 as shown. Support plate 50 in turn is mounted to a pair of brackets 52 and 54. Brackets 52 and 54 include collars which engage turret posts 16 and 17, thereby allowing the user to adjust the height of the bottle stabilizer assembly as a whole.

In setting up bottle stabilizer assembly 20, the user adjusts its height via brackets 52 and 54, and adjusts the profile of belt 25 via screws 48 and 49. These preparations should be made in accordance with the height of bottles B so that the top of each bottle first contacts belt 25 roughly midway along its lower surface. During the further advance of bottle B on outfeed conveyor 14 to phantom position B', the downwardly biased belt will hold the bottle in an upright orientation and stabilize the bottle speed at that of conveyor 14.

While various aspects of the invention have been set forth by the drawings and the specification, it is to be understood that the foregoing detailed description is for illustration only and that various changes in parts, as well as the substitution of equivalent constituents for those shown and described, may be made without departing from the spirit and scope of the invention as set forth in the appended claims.

We claim:

1. Improved bottle-handling apparatus, of the type including a rotating turret, and an underlying conveyor which transports bottles emerging from the turret, wherein the improvement comprises means for stabilizing bottles passing from the turret to the conveyor, comprising:

an overlying conveyor belt travelling at the speed and direction of the underlying conveyor;

a runner plate pressing downwardly against the overlying conveying belt, said runner plate being pivotally mounted solely at its upstream end and extending substantially the horizontal extent of the overlying conveyor belt; and means for downwardly biasing the runner plate and overlying conveyor belt to contact bottles on the underlying conveyor, wherein in the absence of bottles said runner plate and said overlying conveyor belt have a descending profile in the direction of bottle advance.

2. Apparatus as defined in claim 1 wherein the runner plate is pivotally mounted to a housing for the downwardly biasing means.

3. Apparatus as defined in claim 2 further including means for adjusting the height of the housing with respect to the overlying conveyor.

4. Improved bottle hadling apparatus as defined in claim 1, wherein the downwardly biasing means comprises a series of vertically oriented compression springs.

5. Apparatus as defined in claim 1 further including means for adjusting the height of the bottle stabilizing apparatus with respect to the underlying conveyor.

6. Apparatus as defined in claim 1 wherein the overlying conveyor belt comprises a rotary belt mounted to a drive pulley and idler pulley.

7. Apparatus as defined in claim 6 further comprising a gear motor to rotate the drive pulley.

* * * * *